United States Patent [19]
Boles

[11] Patent Number: 5,135,561
[45] Date of Patent: Aug. 4, 1992

[54] AMMONIUM SULFATE SUSPENSION INTERMEDIATES FOR NITROGEN-SULFUR FLUIDS

[75] Inventor: Jeffrey L. Boles, Tuscumbia, Ala.

[73] Assignee: Tennessee Valley Authority, Muscle Shoals, Ala.

[21] Appl. No.: 748,567

[22] Filed: Aug. 22, 1991

[51] Int. Cl.⁵ .................. C05C 9/00; C05C 11/00; C05C 13/00
[52] U.S. Cl. .................................... 71/28; 71/29; 71/30; 71/63; 71/64.08; 71/64.09; 71/64.1
[58] Field of Search ........................ 71/28-30, 71/63, 64.08, 64.09, 64.10

[56] References Cited

U.S. PATENT DOCUMENTS

| | | | |
|---|---|---|---|
| T101803 | 5/1982 | Jones | 71/30 |
| 4,116,664 | 9/1978 | Jones | 71/29 |
| 4,239,522 | 12/1980 | Wilson | 71/29 |
| 4,388,101 | 6/1983 | Lowder | 71/29 |
| 4,762,546 | 8/1988 | Boles | 71/30 |

FOREIGN PATENT DOCUMENTS 811080  4/1969  Canada .

*Primary Examiner*—Ferris Lander
*Attorney, Agent, or Firm*—Robert A. Petrusek

[57] ABSTRACT

The present invention utilizes inexpensive, low-quality by-product ammonium sulfate (AS) characterized as having poor storage, handling, and use properties and normally unsuitable for use as a solid fertilizer because crystals thereof are very fine and of a undesirably high-moisture content. This invention involves production of high-quality, long-storing suspension intermediates directly from AS slurries or AS crystals, followed by storage of the resulting suspensions as intermediate raw materials, and further followed by production of solution fertilizers from such suspension intermediates. The instant invention provides for: (1) successful storage, handling, and use of a converted low-quality, inexpensive forms of AS, which would otherwise be difficult to handle and use; (2) production of fluid sulfur sources from such converted and stored AS materials for one-third or less the cost of other fertilizer sulfur sources such as ammonium thiosulfate solution; (3) production of solution fertilizers from such intermediates; (4) elimination of the need for costly crystallizer systems normally required for production of AS crystals large enough for satisfactory storage and use as solid fertilizer; and (5) elimination of the need for the costly steps of centrifuging and drying of AS crystals subsequent to their production, which subsequent drying treatment is required to ensure satisfactory storage and subsequent use.

23 Claims, 1 Drawing Sheet

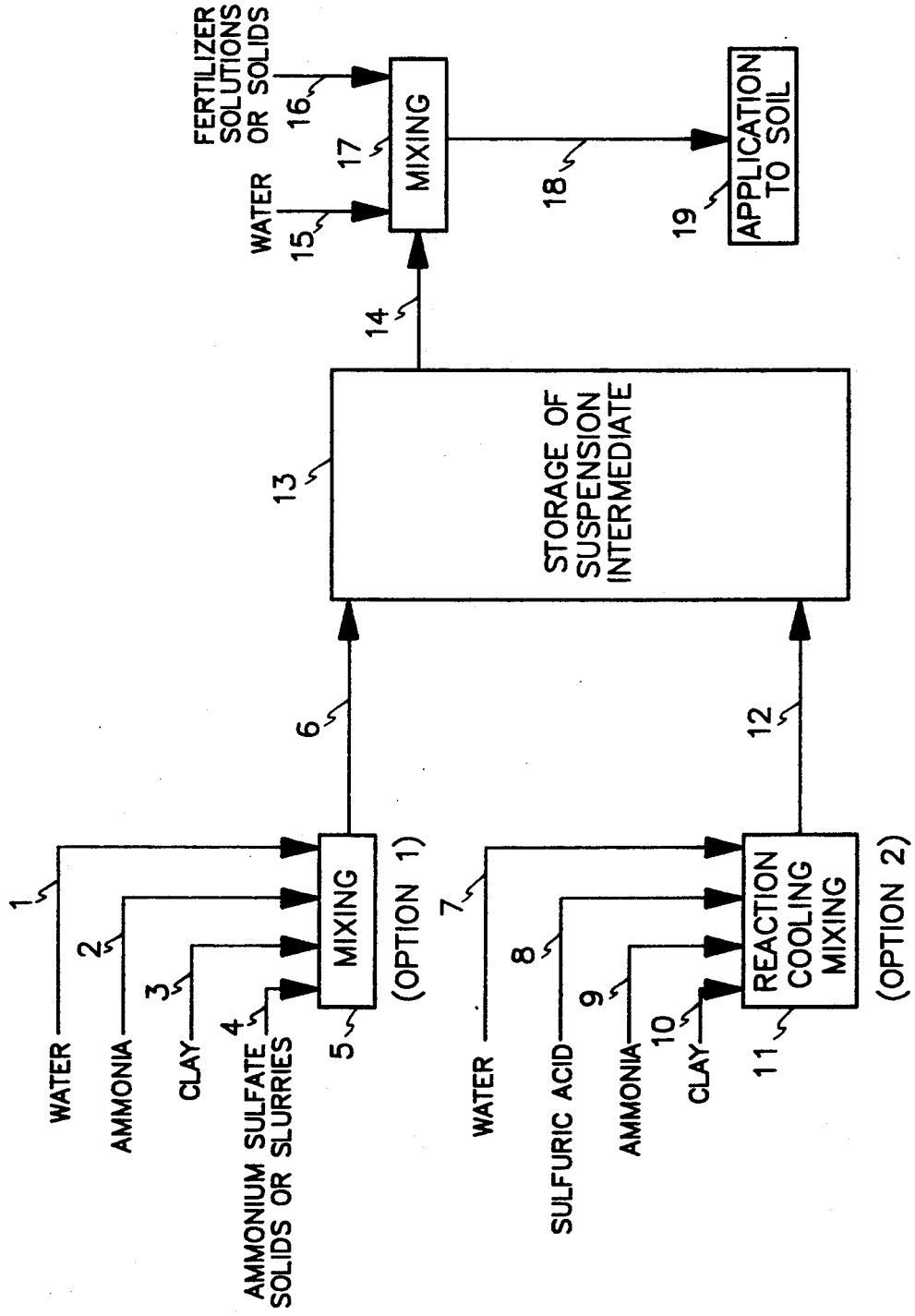

AMMONIUM SULFATE SUSPENSION INTERMEDIATES FOR NITROGEN-SULFUR FLUIDS

The invention herein described may be manufactured and used by or for the Government for governmental purposes without the payment to me of any royalty therefor.

INTRODUCTION

The present invention relates to new, novel, and relatively simple and inexpensive methods, processes, and techniques for using a very inexpensive, low-quality form of by-product ammonium sulfate (AS) which normally has very poor storage, handling, and use properties, and is normally most unsuitable for use in the production of solid fertilizers because crystals thereof, as delivered, are too small and wet. More particularly, the present invention relates to production of low-cost sulfur sources for fluid solutions derived from an intermediate product which in turn results from conversion of such by-product AS. Thus, the product of the instant invention costs about one-third or less of other conventionally used fluid fertilizer sulfur sources such as ammonium thiosulfate solution.

Still more particularly, the present invention relates to novel techniques for producing concentrated, high-grade, high-quality, long-storing suspensions directly from low-cost, impure AS slurries or crystals by operation of simple and economical processes which can be either of the batch or continuous type. The present invention most preferably provides for storage of the resulting suspensions as intermediate raw materials, and subsequently the production of nitrogen-sulfur (NS) solution fertilizers from such suspension intermediates.

Still more particularly, the present invention relates to new and novel techniques for the successful and simple conversion, storage, handling and use of a low-quality form of AS followed by the ultimate production of solution fertilizers therefrom for final application to the soil, which solution fertilizers are much easier to handle and apply than suspensions, which new techniques at least substantially eliminate the need for large, elaborate, and costly crystallizer systems, which are normally required for production of AS crystals large enough for satisfactory storage and use as solid fertilizer, and which new techniques also eliminate the need for the costly and difficult process steps of centrifuging of the AS slurry and subsequent drying of the resulting separated AS crystals.

BACKGROUND OF THE INVENTION

1. Field of the Invention

Ammonium sulfate is an important nitrogen-sulfur fertilizer in United States and world agriculture. It is produced as a by-product of coke or caprolactam production as well as by ammoniation of spent sulfuric acid. By-product ammonium sulfate supply in the United States has remained relatively constant over the past several years at approximately 2,000,000 tons per year. The utilization of ammonium sulfate as a fertilizer is oftentimes advantageous since it contains both nitrogen and sulfur in readily available forms and it is strongly acid forming, a benefit when applied to alkaline soils. Furthermore, it is a source of ammoniacal nitrogen not vulnerable to denitrification and it also is a biuret-free nitrogen source eminently useful for citrus fertilization. These advantages, as well as others, have caused ammonium sulfate to be viewed as an economical nitrogen and sulfur source compared to substitute products. Furthermore, alternate sources of fertilizer sulfur such as commonly used ammonium thiosulfate (ATS) solution and elemental sulfur (ES) are much more costly than the low-quality, small-crystal variety of by-product ammonium sulfate. Substitution of this low-quality, small-crystal form of ammonium sulfate for ATS solution or ES could provide truly remarkable savings and increased profits to fertilizer dealers by greatly reducing their raw material costs for both fertilizer sulfur and nitrogen. In the majority of cases the savings range from $75 to over $100 for each ton of ATS solution and over $200 for each ton of ES suspension replaced with the AS fluids of the present invention. This would represent a very large savings in the fertilizer industry, where only a few dollars per ton is considered a substantial difference in price.

However, much of the by-product AS on the market today is most unsatisfactory for storage or use because the by-product AS crystals are too small and/or contain too much moisture. To be satisfactory for storage and use, AS must ordinarily be produced and shipped in the form of large, relatively dry crystals or granules. Small AS crystals pack and cake severely during shipping and storage, making the material quite difficult or impossible to handle, mix, or apply as a solid. Incidences of entire storage bins of this low-quality AS rapidly becoming solidified or essentially one solid piece have been reported, precluding use of the material as well as removal of the material to make room for other fertilizer materials. Use of dynamite to break up the solidified material has been reported. These small, often wet AS crystals have been observed to essentially fuse together into an almost ceramic state. If the material can be broken up, it must be carefully screened to remove large lumps which remain and complicate blending and application of the material. The larger AS crystals or granules are considered more suitable for bulk blending and application because they are more well matched in size with other fertilizer solids normally used in bulk blending and application in solid form; the small crystals are unsuitable for this purpose because segregation and uneven application occurs with fertilizer mixtures containing widely varying particle sizes (see Hoffmeister, George. "Quality Control in a Bulk Blending Plant," Proc. TVA Fertilizer Bulk Blending Conference, Louisville, Ky., Aug. 1-2, 1973). However, the large-crystal and granular forms of AS are considerably more expensive (2 to 8 times as much depending on location) than the low-quality, small-crystal variety, because processing costs are considerably higher for granulating the AS or for producing large AS crystals and because the larger-sized varieties simply bring higher prices on the market because of the demand for their higher quality. Granulation of ammonium sulfate is a complex and expensive operation which requires large production rates to be profitable. Also, production of large AS crystals requires complex and expensive crystallizer systems with long crystallizer retention times as well as costly centrifuging and drying operations (see "Ammonium Salts, Nitric Acid, and Nitrates," *Fertilizer Manual*, International Fertilizer Development Center, Reference Manual IFDC-R-1, Published December 1979, Chapter VIII, pages 83-85). On the other hand, the small and often wet crystal varieties of AS such as the by-product of coke production or the AS fines portion of other AS production operations, are considerably less expensive than the granular or large crystal varieties, mainly because of the low demand on the market for AS with such poor properties. In addition, these small-crystal, low-quality forms of AS are the products of simple and relatively crude crystallization systems employed in low production rate applications or in other situations where the more elaborate and expensive processing systems required for production of granules or large crystals are either unaffordable or otherwise not practical or desirable. For example, in production of coke, which is used as a carbon source in steel production, coal is heated in ovens, resulting in formation of the coke and a coke gas containing ammonia. The ammonia in the coke gas must be removed early in the process for corrosion considerations. The ammonia is removed by scrubbing the coke gas with sulfuric acid and the effluent from the scrubber is ammonium sulfate slurry. This ammonium sulfate slurry is then concentrated with respect to the solids content and then simply sent to a centrifuge or other equipment to remove the ammonium sulfate liquid from the ammonium sulfate crystals. Of course, the slurry, if not treated, will quickly deposit the solids content thereof onto the bottom of storage vessels thereby rendering same totally useless. Thus, the AS slurry must be subjected to crystal removal operations shortly after it is produced. Obviously, it cannot be shipped or stored as made. The crystals exit the centrifuge small and wet and are sent to storage in this condition without a drying step, exhibiting all of the aforementioned problems with these types of crystals. Drying the ammonium sulfate crystals improves storage of the small crystals somewhat but the drying step is expensive, and even the dried fine-crystal AS is still quite unsatisfactory for use in the solid fertilizer industry because it is not well matched in size with other fertilizer solids and still tends to pack and cake. Larger ammonium sulfate producers such as in the caprolactam industry have expensive, elaborate, and large crystallizers and use same with long retention times in an effort to produce large crystals. They also have to use rather expensive centrifuges, and expensive driers in an effort to improve product storage properties (see Reference Manual IFDC-R-1). These types of operations result in formation of larger, drier crystals with improved storage properties but at greater cost for production; however, even these larger, drier crystals are often too small to be used satisfactorily in production of solid fertilizer blends.

Although these small-crystal, low-quality, inexpensive forms of AS are quite unsuitable for storage, shipping, use, and application as a solid, it has now been discovered that they are ideal for production and application in suspension form. More succinctly, such ammonium sulfate, which is the lowest quality as a solid fertilizer, is of the highest quality when in suspension form, because the production and very existence of a plethora of such small crystals result in suspensions having superior storage, handling, use, and application properties. Since the AS provides a very inexpensive raw material feedstream, production of such AS suspensions proves to be considerably more economical than other commonly available fluid fertilizer sulfur sources, such as ATS solution and ES suspensions, supra. It has now been found that production of AS in suspension form from these low-quality, small-crystal varieties of AS provides a successful and stable means for storage thereof, thereby providing the fertilizer dealer with a good, inexpensive fluid sulfur source immediately ready, when needed during the peak fertilizer rush season, without the complications and time lost in having to first break up and then screen solid AS and/or dissolve same in aqueous media. It has been further found that said crystal-containing AS suspensions can, after long periods of storage, be successfully used in production of crystal-free, true solution fertilizers. Although the logistics of fertilizer operations favor concentrated suspension for storage and shipping, crystal-free solution fertilizer solutions are preferred for application. Solutions can be applied through smaller nozzles at more uniform rates with little or no danger of plugging of the lines or nozzles. Accordingly, the lower concentrations of the crystal-free solutions of the present invention are not an important factor and are more than offset by the ease and uniformity of application of the crystal-free solutions.

Heretofore, compositions and processes of the prior art from which NS fluids are produced, using either ammonium sulfate or a combination of sulfuric acid and ammonia, have for the most part been restricted to being weak solution of low-grade and low-sulfur content because of the relatively low solubility of such ammonium sulfate in water and various other fertilizer fluids. Even with AS in water along, the highest solution grade which can normally be made is 8-0-0-9S. Of course, such low concentrations substantially increase shipping and storage costs per unit of plant food as well as severely limit the degree of flexibility in formulating desired grades and compositions of fluid fertilizer required in the fluid fertilizer industry. In practice of prior-art teachings for production of NS suspensions containing undissolved fertilizer salts, many of the products have contained undesirable solid phases which result in poor storage and handling properties or they have contained other fertilizer compounds, such as urea and/or ammonium nitrate, which substantially increase the cost of production and lower the products' economic advantage over other fertilizer sulfur sources. In either case, the NS suspensions of the teachings of the prior art contain appreciable proportions of undissolved solids at the time of application, which solid phase unduly complicates application of the suspensions to the soil when crystals therein plug spray nozzles or settle to the bottom of tanks, during the vibrations which normally occur during transit. Indeed, the propensity of many suspensions to settle out during transport, as by rail, has been specifically addressed in U.S. Pat. No. 4,066,432, Jones, Jan. 3, 1978, assigned to the assignee of the present invention.

2. Description of the Prior Art

The prior art to date reveals that there are available a number of methods and means which teach the production, in one way or another, of nitrogen-sulfur fluid fertilizers using ammonium sulfate and/or sulfuric acid and ammonia. Some of these prior-art teachings are represented by the investigations, teachings, and disclosures set forth in the following patents: U.S. Pat. No. 4,762,546, Boles, Aug. 9, 1988 (assigned to the assignee of the present invention); U.S. Def. Pub. No. T101,803, Jones et al., May 4, 1982 (assigned to the assignee of the present invention); U.S. Pat. No. 4,116,664, Jones, Sept. 26, 1978; Canadian Patent No. 811,080, Ramaradhya, Apr. 22, 1969; U.S. Pat. No. 4,388,101, Lowder, Jun. 14, 1983; U.S. Pat. No. 4,239,522, Wilson et al., Dec. 16, 1980. Procedures for producing fluid fertilizers containing both nitrogen and sulfur have been developed, since fluid fertilizers containing sulfur are now needed in many regions of the country for soils which are sulfur deficient. One particular procedure for production of a liquid fertilizer containing both nitrogen and sulfur (as in Jones '664, supra) involves reaction of urea with sulfuric acid to form a liquid nitrogen-sulfate fertilizer comprising urea-sulfate and liquefied urea. Sulfuric acid is added gradually to urea, which urea is preferably in powdered or prilled form, and added in controlled amounts to hold the temperature of the resulting reaction within prescribed limits. The combination of sulfuric acid and urea form a resulting reacting molten slurry which is blended slowly during the reaction period. Sulfuric acid is gradually added until the total desired amount thereof has been added, and blending is continued until the slurry becomes completely liquefied. Water is subsequently added to produce desired products which will remain in liquid form at normal ambient temperatures. From the practice of this procedure, a resulting product of grad 31-0-0-9.7S will begin to solidify at a temperature of about 60° F. If this product is diluted with water to a grade of 29-0-0-9S, the then resulting product will begin to solidify at about 10° F. The pH of these products ranges from 0.4 to 1.0.

The practice of another prior-art teaching reportedly also yields nitrogen-sulfur suspension (as in Ramaradhya 811,080, supra). This procedure involves pregelling clay in urea-ammonium nitrate solution (32% N) and incorporating finely divided elemental sulfur in the solution-clay mixture by mixing in a tank with a propeller-type mixer. The grade of the resulting suspension is approximately 24-0-0-23S, and it is reported that the stability of the product is adequate for short-term storage.

Still another method for producing a nitrogen-sulfur suspension taught by Jones, et al. ('803, supra) involves the reaction of sulfuric acid with gaseous ammonia and the simultaneous addition thereto of a urea-water solution in a single-stage reactor to produce a resulting boiling urea-ammonium sulfate solution. The boiling solutions are then rapidly cooled in two stages to about 100° F. to produce therein an abundance of small urea crystals. The finished product is of grade 29-0-0-5S and contains mostly urea as the solid phase. Because of urea's high solubility and highly temperature-dependent solubility, urea crystals, as is generally well known, are subject to rapid growth to large sizes during storage.

In still another reported procedure, Lowder ('101, supra) teaches the production of nitrogen-sulfur solutions by first mixing sulfuric acid in water, followed by dissolving urea into the resulting acid solution, and finally by adding thereto anhydrous ammonia. However, because the products are solutions, in which the highest grades were limited by solubility, they are low in grade (19 to 25% nitrogen and 3 to 6% sulfur) and have rather high crystallization temperatures (32° to 40° F.) below which the products cannot be stored, because the large crystals which form settle to the bottom of storage tanks or plug up solution application equipment. Also, the low concentrations of these solutions substantially increase shipping and storage costs per unit of plant food as well as severely limit the degree of flexibility in formulating desired grades and compositions of fluid fertilizer normally expected in the fluid fertilizer industry with other sulfur sources.

In yet another procedure taught in the prior art, Wilson, et al. ('522, supra) produce nitrogen-sulfur solutions containing urea, ammonium nitrate, and ammonium sulfate. Because these products are solutions, the grades are low relative to suspensions and, because of ammonium sulfate's low solubility in UAN-32 (a urea-ammonium nitrate solution containing 32% nitrogen), the sulfur contents of these products are relatively low unless the nitrogen content thereof is drastically reduced. Here again, the low concentrations of these solutions substantially increase shipping and storage costs per unit of plant food as well as severely limit the degree of flexibility in formulating desired grades and compositions of fluid fertilizer normally expected in the fluid fertilizer industry with other sulfur sources.

In still another procedure taught in the prior art, Boles ('546, supra) produces nitrogen-sulfur suspensions from by-product ammonium sulfate or sulfuric acid and ammonia with addition of other nitrogen fluids or solids containing urea and/or ammonium nitrate. However, because these products contain urea and/or ammonium nitrate, which are relatively high-priced fertilizer compounds compared with small-crystal ammonium sulfate, their economic advantage over other higher priced fertilizer sulfur sources such as elemental sulfur and ammonium thiosulfate solution is reduced. In addition, if appreciable proportions of urea and ammonium nitrate are not added, the product pH is too low, which precludes proper gelation of the suspending clay and results in rapid deterioration of the products' physical and storage properties. Also the NS suspensions produced by Boles contain appreciable proportions of undissolved solids at the time of application which complicates application of the suspensions to the soil when crystals plug spray nozzles or settle to the bottom of application tanks during the vibrations which normally occur during transit to the application site or during the actual application operation.

It will, of course, be appreciated that there is no suggestion in the teachings of any of the above-mentioned, prior-art references of the viable process and/or techniques as well as the compositions resulting from the practice of the instant invention for easily and consistently producing, storing, handling, and using the very inexpensive, low-quality form of by-product ammonium sulfate (AS) which has very poor storage, handling, and use properties and is normally most unsuitable as a solid fertilizer because the crystals are too small and wet. It will be further appreciated that the art does not teach a process for the production of concentrated, high-grade, high-quality, long-storing suspensions containing appreciable AS solids directly from low-cost, impure AS slurries or crystals, by operation of a simple and economical process which can be either of the batch or continuous type, and in which process the addition of very small amounts of ammonia or another suitable base such as potassium hydroxide during production of said suspensions is utilized as a clay stabilizer in substitution for much larger amounts of higher priced-compounds such as urea and/or ammonium nitrate, and wherein the resulting AS suspensions are, or can be, stored as intermediate feed stream materials and further, wherein is produced crystal-free, true solution NS fertilizers from such crystal-containing suspension intermediates and still further, wherein there is eliminated the need for large, elaborate, and costly crystallizer systems, which are normally operated for long periods of time for effecting sufficient size of crystal growth of the resulting AS crystals such that they will be large enough for satisfactory storage and use as solid fertilizer and even still further, wherein elimination of the need for the costly and difficult process steps which are normally required for production of AS crystals dry enough for satisfactory storage and use as solid fertilizer including the centrifuging of the AS slurry to effect separation of the crystals from the mother liquor as well as the final drying of such separated AS crystals.

SUMMARY OF THE INVENTION

The instant invention relates to novel techniques and resulting compositions for the production of highly concentrated, high-quality nitrogensulfur solution fertilizers preferably made from low-cost, low-quality, very fine crystals of, or crystal-containing by-product ammonium sulfate (AS) or alternatively made from a combination of low-cost, by-product sulfuric acid and ammonia, and wherein very small amounts of ammonia are utilized as a clay stabilizer. Of particular importance to the practice of the instant invention is the production of concentrated, high-grade, high-quality, long-storing suspensions as intermediate materials for ultimately producing said NS solutions, wherein such intermediates contain appreciable quantities of AS solids and wherein such suspensions may be made directly from low-cost, impure AS slurries or crystals derived from AS production facilities. In the practice of the instant invention, the addition of very small amounts of ammonia or another suitable base such as potassium hydroxide during production of said suspensions can be substituted as a clay stabilizer in lieu of the higher priced-compounds such as urea and ammonium nitrate materials conventionally used and incidentally used in much larger amounts. An unexpected feature of the instant invention is the fact that the resulting AS suspensions can conveniently be stored as intermediate raw materials, and that production of substantially crystal-free true solution type fluid fertilizers can be subsequently effected from such suspension intermediates. Another important feature of the instant invention is the elimination of the need for large, elaborate, and costly crystallizer systems, and also the elimination of the need for the costly and difficult process steps of drying of the AS crystals or even centrifuging of the AS slurry.

Still another important feature of the instant invention is that it provides a successful means for utilizing a source of fertilizer sulfur in fluid forms which are substantially less expensive than other commonly used and high-priced fluid fertilizer sulfur sources, such as ATS solution and ES suspensions.

The gist underlying effecting the concepts of the instant invention involve first producing an ammonium sulfate suspension intermediate to thereby effect successful, stable, and economical means for converting the low-quality, low-price, very fine-crystal variety of ammonium sulfate by-product material, to an AS suspension intermediate having improved storage properties and thereafter producing a crystal-free solution fertilizer from the crystal-containing AS suspension intermediate by addition of water and/or nitrogen solutions or solids or other fertilizer materials to yield solution fertilizers with the appropriate and soil-specific nitrogen-to-sulfur ratios. It has been determined that the suspension intermediates herein produced have very desirable long-term storage properties, because ammonium sulfate is the sole solid phase present. Ammonium sulfate's solubility is relatively temperature independent, which results in the products having the following unique and very desirable physical properties and storage and handling characteristics:

1) very little crystal growth during exceptionally long-storage periods;
2) very little crystal formation and growth in clear liquid layers during exceptionally long-storage periods;
3) very little if any viscosity increase with decrease in temperature over an exceptionally wide range of temperatures;
4) can be diluted or mixed with other fertilizer materials in widely varying proportions; and
5) virtually unaffected by changes in temperature over an exceptionally wide range.

The effecting of the principal method or embodiment comprising the instant invention requires only a minimal amount of relatively inexpensive equipment, and is simply and easily placed into practice by setting into motion a first-charging step wherein a mixing vessel is partially filled with water of formulation. While agitating the water, a small amount of ammonia or another suitable base such as potassium hydroxide is added and mixed therein. Next, the suspending clay is added with continued agitation and mixing. Subsequent to mixing the clay, relatively inexpensive, very fine-sized by-product ammonium sulfate solids, usually having a relatively high moisture content are added to the vessel with continued agitation and the resulting mixture is agitated or recirculated for a period of time sufficient to effect gelation of said clay. Addition of ammonia or another suitable basic compound is necessary to allow proper gelation of the suspending clay and to preserve the suspending properties of the clay during subsequent storage. Alternatively, by-product AS slurry, containing an appreciable amount of such finely-sized AS crystals, may be utilized, particularly if the mixing vessel is located relatively close to the coke, caprolactam, or other chemical processing operations which have a by-product stream of such AS slurry.

A second embodiment of the instant invention also requires only a minimal amount of relatively inexpensive equipment and is simply and easily placed into practice by setting into motion a first-charging step wherein a reactor vessel is partially filled with the water of formulation and relatively inexpensive by-product sulfuric acid. With agitation, ammonia next is added to the mixture in the reactor vessel until the mixture is near-neutral pH (about pH 7). With continued agitation, the hot mixture is cooled quickly to about 100° to 120° F., the suspending clay is then added, and after sufficient mixing therewith the suspension product is then sent to storage. Other embodiments of the instant invention comprise continuous-type production versions of the two previously described embodiments.

OBJECTS OF THE INVENTION

It is therefore the principal object of the present invention to develop new methods and compositions resulting therefrom for easily producing, storing, handling, and using a very inexpensive, low-quality form of by-product ammonium sulfate (AS), which by-product AS has very poor storage, handling, and use properties and is normally most unsuitable as a solid fertilizer because the crystals are too finely-sized and usually are too wet.

Another principal object of the present invention is to develop new methods and resulting compositions for producing concentrated, high-grade, high-quality, long-storing suspensions directly from low-cost, impure by-product AS slurries or crystals by operation of a simple and economical process which can be either of the batch or continuous type, subsequently storing the resulting suspensions as intermediate raw materials, and still subsequently producing crystal-free solution fertilizers from such crystal-containing suspension intermediates, thereby greatly facilitating application of the final fertilizer product and making it much more versatile and suitable for handling among a much wider range of fertilizer dealers.

Still a further object of the present invention is to provide a usable source of fertilizer sulfur to the fertilizer industry which is of drastically lower cost and therefore substantially more economical than other commonly available, commonly used and high-priced fertilizer sulfur sources, such as ammonium thiosulfate (ATS) solution and elemental sulfur (ES) or ES suspensions.

A still further object of the present invention is to develop methods for elimination of the need for large, elaborate, and costly crystallizer systems in the by-product ammonium sulfate industry, which crystallizer systems are normally required for production of AS crystals large enough for satisfactory storage and use as fertilizer, and for elimination of the need for the costly and difficult processes of first centrifuging of the AS slurry to effect separation of the extremely fine crystals from mother liquor and subsequently drying of the resulting AS crystals which is normally required for production of AS crystals dry enough for satisfactory storage and use as solid fertilizer (see Reference Manual IFDC-R-1, supra) albeit, said drying step is not often practiced in the production of fine-crystal, coke-oven by-product ammonium sulfate.

Still a further object of the present invention relates to compositions, means, and methods for the efficient production of high-grade, high-quality, long-storing suspension fertilizer intermediates containing therein relatively small particles of fertilizer solids and displaying unique and very desirable physical properties as well as long-term storage characteristics which include little or no crystal growth during exceptionally long-storage periods including any growth in any resulting clear or supernatant liquid layers as well as little, if any, viscosity increase with decrease in temperature over an exceptionally wide range of temperatures.

Still a further object of the present invention is to develop new methods and means for producing highly concentrated nitrogen-sulfur solution fertilizers made from ammonium sulfate suspension intermediates, which intermediates in turn are made by a simple and inexpensive process by conversion of very finely-sized by-product ammonium sulfate slurry directly into such intermediate, the whole of which eliminates the need, heretofore thought to be necessary, of removing such crystals from their mother liquor thereby, for the first time, placing such by-product ammonium sulfate slurry in a technically competitive position with much more costly sulfur source alternatives, albeit, requiring usage thereof within a reasonably and relatively short period of time subsequent to its production.

Still further and more general objects and advantages of the present invention will appear from the more detailed description set forth in the following descriptions and examples it being understood, however, that this more detailed description is given by way of illustration and explanation only and not necessarily by way of limitation, since various changes therein will undoubtedly occur to, and therefore may be made by, those skilled in the art without departing from the true scope and spirit of the instant invention.

DESCRIPTION OF THE DRAWING

The present invention, together with further objectives and advantages thereof, will be better understood from a consideration of the following description taken in connection with the accompanying drawing and examples in which the FIGURE is a flowsheet generally illustrating the principles of my new and novel processes for utilizing low-cost by-product AS material as a sulfur source, or alternatively utilizing low-cost by-product sulfuric acid. Note: Although the description which follows is conveniently directed to a batch operation, those skilled in this art will readily appreciate that only a few simple adjustments are necessary to practice same on a batch-continuous or continuous basis.

Referring now more specifically to the FIGURE and Option 1 thereof, water if needed for dilution and for providing fluidity to a later mentioned suspension, and ranging in amounts up to about 50 weight percent of the total material charge and preferably in the range of from about 20% to 35% by weight along with small amounts of ammonia, usually ranging from about 0.1 to about 3.0 weight percent of the total material charge or, alternatively, other suitable base material including potassium or sodium hydroxide, are fed from sources not shown through line 1 and line 2, respectively, into mix tank 5 (first mixing means 5). Although not shown, mix tank 5 is equipped with stirrer means and/or recirculation pump. After introduction of said water and ammonia or other suitable base into first mixing means 5, agitation and/or recirculation is started. After said agitation and/or said recirculation is commenced, suspending clay of the type including attapulgite, bentonite, and mixtures thereof and comprising generally from about 0.5 to about 4.0 weight percent of the total charge, from a source not shown, is fed through line 3 into mix tank 5. When addition of said clay is complete, a predetermined amount of ammonium sulfate solids or slurry, for formulation, is fed from a source not shown through line 4 into mix tank 5. Understandably, the objects of the instant invention are best met when such ammonium sulfate is a by-product material source from chemical processing operations including production of coke or caprolactam. After addition of said ammonium sulfate is complete, said agitation and recirculation is continued for a period of time ranging from a few minutes upwards of half an hour, but preferably from about 5 minutes to about 20 minutes and most preferably about 10 minutes. The resulting intermediate suspension product(s) are then removed from tank 5 and pumped to and introduced into storage tank 13 through line 6. When said suspension intermediates are needed for fertilizer operations, water of formulation is first fed, from a source not shown, to mixer 17 (second mixing means 17) through line 15. Although not shown mixer 17 is equipped with an agitator and/or recirculation pump. After addition of said water to second mixing means 17 is complete, agitation and/or recirculation is started. After said recirculation and/or agitation is started, said suspension intermediate in storage tank 13 is pumped through line 14 into mix tank 17 and agitation and recirculation in mix tank 17 is continued for a short of time, usually about 1 to about 5 minutes after which time various other fertilizer fluids or solids in amounts necessary for obtaining the desired formulation are fed through line 16 into mixer 17 with further continued agitation and recirculation maintained therein for a short period of time, usually about from 1 to 5 minutes, which results in production of the final crystal-free solution product(s) which are at that time removed from second mixing means 17 via line 18 either to short-term, usually less than a few days, storage or directly to application equipment generally shown at 19.

As an alternative process for production of said suspension intermediates, referring again now more specifically to the FIGURE, OPTION 2, water ranging upwards to about 50 weight percent of the total material charge, if needed, to allow for subsequent evaporation and/or for dilution and also for providing fluidity to a later mentioned suspension intermediate, is fed, from a source not shown, through line 7 and into reactor-cooler-mixer 11. Although not shown, reactor-cooler-mixer 11 (first mixing means 11) is equipped with an agitator and/or recirculation pump and with cooling means, such as a water jacket or tank coils, or with other external means of cooling, such as a spray cooling tower or shell and tube heat exchanger, all common and well known in the art and not shown here for sake of convenience. After introduction of said water into mixer 11, agitation and/or recirculation is started. Next, a predetermined amount of sulfuric acid preferably, waste, by-product or spent, for formulation, and usually in the range of from about 40 to about 80 weight percent of the total material charge (waste, by-product or spent $H_2SO_4$ is usually supplied in a concentration ranging from about 10% to about 80% $H_2SO_4$, but herein calculated as 100% $H_2SO_4$) is fed from a source not shown through line 8 into mixer 11. Subsequently or simultaneously to the addition of said sulfuric acid, a quantity of ammonia required to attain or maintain, respectively, a near-neutral pH (about 7) in the resulting mixture and usually in the range of from about 10 to about 25 weight percent of the total material charge (calculated as anhydrous) is fed, from a source not shown, through line 9 into first mixing means 11. When addition of said ammonia and said sulfuric acid is complete and the mixture is at about a neutral pH, the resulting hot slurry, which may be at or near boiling is quickly cooled with cooling means, not shown, to about 120° F. or lower, with agitation and/or recirculation continuing during cooling. After the contents of reactor-cooler-mixer 11 have reached 120° F. or lower, attapulgite or other suspending clay, supra, is fed, from a source not shown, through line 10 into reactor-cooler-mixer 11. When addition of said remaining clay is complete, agitation and/or recirculation of the cooled suspension is continued for a period of time ranging from a few minutes up to perhaps half an hour, but preferably from about 5 to about 20 minutes and most preferably about 10 minutes. The resulting intermediate suspension product(s) is sent through line 12 to storage 13. Said suspension intermediates can then be used when needed in production of said crystal-free solution fertilizers, supra, i.e., sent to second mixing means 17 along with water and nitrogen sources such as UAN, urea, or ammonium nitrate.

Of course, it will be appreciated that in still other embodiments of the instant invention, the ammonium sulfate suspension intermediates produced according to either Option 1 or Option, 2 supra, can also be produced on a batch-continuous or a continuous production basis with the equipment described in the first two embodiments, whereby the feed materials are fed simultaneously on a batch-continuous or a continuous basis.

DESCRIPTION OF THE PREFERRED EMBODIMENTS

In carrying out the objects of the present invention in one form thereof, means and methods have been developed which are eminently suitable for utilizing the aforementioned low-quality, low-priced by-product ammonium sulfate. As noted above, it is endowed, as received, with very poor storage, shipping, handling, use and application characteristics and is most unsuitable for either direct application or bulk blending with other solid fertilizer materials. In practice of this invention, a highly storage-stable suspension intermediate, containing appreciable proportions of ammonium sulfate solids is produced with subsequent storing of such suspension intermediate until it is needed, wherefrom crystal-free solution fertilizers are produced from the crystal-containing suspension intermediate. It has been found that these highly storage-stable suspension intermediates can be produced very simply and economically by blending by-product ammonium sulfate crystals or AS slurries as received from, for instance, coking or caprolactam by-product streams with small amounts of ammonia and, if needed, additional water together with the requisite amounts of suspending clay.

In practicing the instant invention in the batch-operation mode, a suitable reaction or mixing vessel is first charged with the water of formulation, if any, and then with small amounts of ammonia or other suitable base. Agitation and recirculation of the resulting mixture is commenced and suitable suspending clay is added thereto. When addition of clay is complete, ammonium sulfate such as crystalline by-product ammonium sulfate or slurry from coke production, is added and the mixture then is recirculated and/or agitated for several minutes to gel the clay and produce the finished suspension intermediate. The period of time for purposes of gelling can preferably range from about 5 minutes to about 20 minutes.

In another embodiment of the instant invention, spent or other low-cost, by-product sulfuric acid and ammonia are used in place of by-product ammonium sulfate, and are added after the water has been charged to the reactor. The sulfuric acid can be added first and then the ammonia can be added to bring the mixture up to a near-neutral pH (about 7) or the sulfuric acid and ammonia can be added simultaneously at rates required to maintain a near-neutral pH. The last procedure is more complicated but, because a near-neutral pH is maintained, the reaction mixture would be less corrosive to the reactor and associated equipment. The ammonia and sulfuric acid react to form ammonium sulfate and produce substantial amounts of heat. The ammonium sulfate solids precipitate as the sulfuric acid in the mixture is being ammoniated even though there is substantial heat resulting from the reaction sufficient to produce a hot (near boiling) slurry, which hot slurry therefrom should be kept agitated and/or recirculated to keep such precipitation solids from settling until at least some of the clay has been added and gelled. In producing these suspensions, reaction of the ammonia and sulfuric acid results in a boiling slurry, so extra water must be added to the reactor to allow for that which will be evaporated. In suspension intermediates products produced with appreciable ammonium sulfate solids, it may be necessary, depending on the equipment used, to add some of the suspending clay prior to cooling the hot slurry to prevent settling of solids and consequently clogging of pipelines. A small amount of clay will help keep the slurry homogeneous until it has been cooled and the rest of the clay can then be added. If possible, it is best to add as much of the clay as possible, and preferably all, after the slurry has been cooled to about 120° F., as subjecting some suspending clays to high temperatures for long periods of time can diminish their suspending qualities and characteristics. A spray cooling tower can be used to cool the suspension intermediates in the instant invention as well as various other types of conventional cooling equipment such as, for example, tank coils, water jackets, or shell and tube heat exchangers.

Advantages realized by practicing the teachings of the instant invention are, in a first principal embodiment, that it provides a successful means for using a very inexpensive, low-quality solid form of by-product ammonium sulfate which normally has very poor storage and handling properties and is normally most unsuitable as a solid fertilizer because the crystals are too small and often too wet, and in another principal embodiment provides a successful means for producing and using a very inexpensive, low-quality slurry form of by-product ammonium sulfate which also has very poor storage, handling, and use properties and is normally most unsuitable as feedstock to fluid fertilizer production because of rapid settling in the slurry and resulting packing of the AS crystals in storage and/or shipping equipment. The equipment needed for practicing the teachings of the present invention, which consists of a reactor or mixer equipped with an agitator and/or recirculation pump (and cooling equipment if sulfuric acid and ammonia are used), is simple, economical, and readily available in a multitude of already existing plants. Further advantages of the instant invention will become apparent hereinafter.

As used herein the term "suspension fertilizer" means and encompasses a fluid fertilizer generally containing nutrients in solution and in finely divided solid form which are held suspended homogeneously by a gelling-type clay. Other active or inert substances may also be present as by-products or by reason of deliberate addition thereto. The grade X-O-O-Y pertains to a product containing X percent nitrogen, expressed as N, no appreciable amounts of phosphorus or potassium, and Y percent sulfur, expressed as S.

EXAMPLES

In order that those skilled in the art may better understand how the present invention may be practiced for successfully producing and using the low-quality, low-priced, small-crystal variety of by-product AS which normally is unsuitable as a solid fertilizer, the following examples are given by way of illustration only and not necessarily by way of limitation. For convenience, attapulgite clay was used as the gelling agent.

EXAMPLE I

In the pursuit of further information for the purpose of more clearly defining the parameters affecting the practice of the instant invention, the investigations herein reported were made to demonstrate the successful procedure for production of AS suspension intermediates to be ultimately used in the production of crystal-free solution fertilizers. Ten tons of a 13-0-0-15S, 3% clay suspension intermediate was produced in a 2-ton batch mixer equipped with agitator and recirculation pump. This processing equipment is essentially a scale model of the 5- to 30-ton batch mix plants commonly used in the fluid fertilizer industry such as, for example, the Fert-O-Batcher Model 1000 by Ferguson Industries. NOTE: Any references made herein to materials and/or apparatus which are identified by means of trademarks, trade names, etc., are included solely for the convenience of the reader and are not intended as, or to be construed, an endorsement of said materials and/or apparatus. The actual equipment used in production of the 13-0-0-15S consisted of a 500-gallon cylindrical, cone-bottom 316 stainless steel tank 52 inches in diameter and 56 inches high, equipped with an electrically-driven variable-speed agitator and a centrifugal recirculation pump with an estimated AS suspension flow rate of 200 to 300 gallons per minute, which pump was used to recirculate the mix tank contents as well as to transfer the final suspension intermediate to outside storage tanks. A screw conveyor (Fert-O-Charger by Ferguson Industries) was used to transfer the by-product ammonium sulfate to the mix tank. The gaseous ammonia was fed by pressure from an outside tank through a small pipeline extending substantially below the surface of the mixer contents. The water was fed to the mix tank through a hose via pressure from the plant water system.

The procedure for operation of the batch-type equipment for the production of the AS suspension intermediate consisted of first charging the mixer with the formulated quantity of water (32.9% of the suspension intermediate weight), starting agitation and recirculation, and then adding to the mix tank a small amount of ammonia (approximately 0.1% of the suspension intermediate weight on an anhydrous basis) sufficient to obtain neutral pH in the product. Next, the suspending clay (as attapulgite and comprising 3.0% of the suspension intermediate weight) was added to the mix tank with continued recirculation and agitation. Next, crystalline solid by-product ammonium sulfate containing about 2% moisture (from the coke industry and comprising about 64% of the weight of the suspension intermediate) was added to the mix tank with continued agitation and recirculation for about 20 minutes to homogenize the resulting mixture, or as in the vernacular of the trade, "gel the clay." All process operations were carried out at ambient temperature. Finally, the suspension intermediate was pumped into an outside storage tank and stored successfully without any observable deterioration in quality for several months before being used in production of crystal-free solution fertilizers.

EXAMPLE II

Ten tons of a 15-0-0-17S, 2.0% clay suspension intermediate were successfully produced and stored outside for several months before use in production of crystal-free solution fertilizers using the equipment and procedure set forth in Example I, supra, the only change being the formulation, which on the bases of suspension intermediate weight was as follows:

| | |
|---|---|
| Ammonium Sulfate (2% moisture) | 72.0% |
| Water | 25.9% |
| Clay | 2.0% |
| Ammonia | 0.1% |

EXAMPLE III

For the purposes of the investigations reflected by these examples in the pursuit of still further definition of the parameters referred to in Examples I and II, supra, this portion of the investigation consisted of use of the 13-0-0-15S suspension intermediate produced and referenced in Example I, supra, to subsequently produce crystal-free solution fertilizer. Thirty pounds of 25-0-0-3S grade crystal-free solution fertilizer were produced from the 13-0-0-15S AS suspension intermediate in a small batch pilot plant which is essentially a scale model of the 5- to 30-ton batch mix plants used commonly in the fluid fertilizer industry, supra, and a smaller version of the batch mix equipment used to produce the AS suspension intermediates referred to in Examples I and II, supra.

The actual equipment used in production of the 25-0-0-3S solution consisted of a 4-gallon cylindrical, cone-bottom 316 stainless-steel tank 9 inches in diameter and 15 inches high, equipped with an electrically-driven variable-speed agitator and a centrifugal recirculation pump with an estimated AS suspension flow rate of 5 to 6 gallons per minute, which pump was used to recirculate the mix tank contents as well as to transfer the final suspension intermediate to carboys for storage tests. The procedure consisted of simply charging the water of formulation (10% of final solution weight) to the mixer, starting recirculation and agitation, and then adding the formulated quantity of the 13-0-0-15S AS suspension intermediate (20% of final solution weight) with continued recirculation and agitation for 5 minutes to dissolve the AS solids. Next, the formulated quantity of commerically available 32-0-0urea-ammonium nitrate (UAN) solution (70% of final solution weight) was added to the mixer with continued agitation and recirculation for 5 minutes to dissolve any remaining AS solids, if any, and to produce the finished solution fertilizer free from crystals of fertilizer salts. All process operations were carried out at ambient temperature, i.e., about 75° F. The 25-0-0-3S solution fertilizer had physical properties typical of solution fertilizers and remained crystal-free after storage for several days at temperatures down to 0° F. Ordinarily, solution fertilizers for direct application are not to be stored for longer periods of time, and are normally prepared by the fertilizer dealer immediately before application to the soil using the common batch fluid fertilizer equipment described in Example I, supra. In some cases, storage of such solutions for short periods (days) might be required for reasons such as unexpected adverse weather conditions, which might preclude application of the fertilizer. The 25-0-0-3S solution, as well as the other solutions in the following examples, will eventually form crystals if stored at 0° F. for extended periods such as, for instance, 2 months. If extended storage of such solutions at such low temperatures is anticipated, production of a slightly lower grade will be required to allow for crystal-free storage at such low temperatures.

EXAMPLE IV

Thirty pounds of a 22-0-0-4S crystal-free solution fertilizer was successfully produced under the conditions and using the equipment and procedure set forth in Example III, supra, the only change being the fertilizer formulation, which, on the bases of final solution weight, was as follows:

| | |
|---|---|
| Intermediate Suspension (13-0-0-15S) | 26.67% |
| UAN (32-0-0) | 57.92% |
| Water | 15.41% |

EXAMPLE V

Thirty pounds of a 20-0-0-5S crystal-free solution fertilizer was successfully produced under the conditions and using the equipment and procedure set forth in Example III, supra, the only change being the fertilizer formulation, which, on the bases of final solution weight, was as follows:

| | |
|---|---|
| Intermediate Suspension (13-0-0-15S) | 33.33% |
| UAN (32-0-0) | 48.96% |
| Water | 17.71% |

EXAMPLE VI

Thirty pounds of a 25-0-0-3S crystal-free solution fertilizer was successfully produced under the conditions and using the equipment and procedure set forth in Example III, supra, with a change in the desired fertilizer formulation, which, on the bases of final solution weight, was as follows:

| | |
|---|---|
| Intermediate Suspension (15-0-0-17S) | 17.65% |
| UAN (32-0-0) | 69.85% |
| Water | 12.50% |

The intermediate suspension of grade 15-0-0-17S, which was used in the above formulations, was derived from that produced in Example II, supra.

EXAMPLE VII

Thirty pounds of a 22-0-0-4S crystal-free solution fertilizer was successfully produced under the conditions set forth in and using the equipment and procedure described in Example III, supra, with a change in the desired fertilizer formulation, which, on the bases of final solution weight, was as follows:

| | |
|---|---|
| Intermediate Suspension (15-0-0-17S) | 23.53% |
| UAN (32-0-0) | 57.72% |
| Water | 18.75% |

Again, the intermediate suspension of grade 15-0-0-17S, noted above, was derived from that of Example II, supra.

EXAMPLE VIII

Thirty pounds of a 20-0-0-5S crystal-free solution fertilizer was successfully produced under the conditions set and using the equipment and procedure set forth in Example III, supra, with a change made in the fertilizer formulation, which, on the bases of final solution weight, was as follows:

| | |
|---|---|
| Intermediate Suspension (15-0-0-17S) | 29.41% |
| UAN (32-0-0) | 48.71% |
| Water | 21.88% |

Still, once again the intermediate suspension of grade 15-0-0-17S of Example II, supra, was used.

EXAMPLE IX

In the pursuit of further information for the purpose of more clearly defining the parameters affecting the practice of the instant invention, the investigations herein reported were made to demonstrate the economic advantages of practicing the teachings of the present invention, which provide a satisfactorily usable source of fertilizer sulfur of drastically lower cost, and therefore being substantially more economical than other commonly available and commonly used fertilizer sulfur sources such as ammonium thiosulfate (ATS) solution and elemental sulfur (ES) or ES suspensions. Very large savings can be achieved by replacing ATS solution or ES suspensions with fluids produced with fine-crystal by-product ammonium sulfate using the teachings of the present invention. In the majority of the cases the savings ranges from $75 to over $100 for each ton of ATS solution and over $200 for each ton of ES suspension replaced with the AS fluids of the present invention. This represents a very large savings in the fertilizer industry, where only a few dollars per ton is usually considered a substantial price differential.

The following equations were developed to allow any liquid fertilizer formulation dealer to determine savings with ammonium sulfate-based fluids on and individual basis. The equations express savings as a function of dealer-specific raw material costs and usage rates. Equations 1 and 2 below represent the savings achieved when ATS solution or 95% ES, respectively, are replaced with AS-based fluids, expressed in terms of dollars saved per ton replaced of either ATS or 95% S. Equations 3 and 4 are simply equations 1 and 2, respectively, multiplied by the dealer-specific annual usage rates of ATS solution or 95% S to determine the annual savings achieved by replacing all ATS or 95% S with AS-based fluids. Finally, equation 5 is the sum of equations 3 and 4, which is the total dealer-specific annual savings by replacing both ATS and 95% S with AS-based fluids.

Equations $$ATS + 0.336U - 1.08AS = Sa \text{ (Savings with AS in \$/ton ATS)} \quad (1)$$

$$S + 2.6U - 3.96AS = Ss \text{ (Savings with AS in \$/ton 95\% S)} \quad (2)$$

$$Sa \times TA = SA \text{ (Annual savings, AS vs ATS, \$/yr)} \quad (3)$$

$$Ss \times TS = SS \text{ (Annual savings, AS vs 95\% S, \$/yr)} \quad (4)$$

$$SA + SS = ST \text{ (Annual savings, all AS, \$/yr)} \quad (5)$$

Where:

ATS is the price of ammonium thiosulfate solution, $/ton.
AS is the price of ammonium sulfate, $/ton.
S is the price of 95% elemental S, $/ton.
U is the price of 32-0-0 urea-ammonium nitrate (UAN) solution, $/ton.
TA represents total annual usage of ATS solution, tons/yr.
TS represents total annual usage of 95% S, tons/yr.
Sa represents savings with AS fluids, $/ton ATS solution replaced.
Ss represents savings with AS fluids, $/ton 95% S replaced.
SA represents annual savings replacing ATS solution with AS fluids, in dollars.
SS represents annual savings replacing 95% S with AS fluids, in dollars.
ST represents annual savings replacing ATS and 95% S with AS fluids, in dollars.
ST represents SA+SS.

These equations were used to determine savings for a case study of a typical fluid fertilizer dealer in Mississippi who produced 32 tons of the subject AS suspension intermediates. Following is an analyses of this dealers savings: The dealer uses, on average, some 650 tons per year of ATS solution and 185 tons per year of 95% ES (in the form of a 70% ES-water suspension). The dealer's average raw material costs are $100 per ton of 32-0-0 UAN solution, $115 per ton of ATS solution, and $60 per ton of by-product AS. It is important to note that these prices for UAN and ATS solution are lower than most other dealers pay because this dealer is located very near the Mississippi River, on which same are very inexpensively shipped. In addition, the dealer purchases these materials in bulk quantities right off the barge during off seasons when prices are low. Using the five equations, supra, these transactions can be represented as follows:

| | | | |
|---|---|---|---|
| Eq 1 | $115 + 0.336*100 - 1.08*60 =$ | $83.80 | saved per ton ATS solution replaced with AS fluids |
| Eq 2 | $270 + 2.6*100 - 3.96*60 =$ | $292.40 | saved per ton 95% S replaced with AS fluids |
| Eq 3 | $83.80*650 =$ | $54,470 | saved annually on ATS solution replaced with AS fluids |
| Eq 4 | $292.40*185 =$ | $54,094 | saved annually on 95% S replaced with AS fluids |
| Eq 5 | $54,470 + 54,094 =$ | $108,564 | total saved annually on both ATS solution and 95% S replaced with AS fluids |

Many dealers who pay more for their UAN and ATS solutions can realize even larger savings. For the typical fluid fertilizer dealer, savings of over $100,000 per year are monumental compared with their total income.

A very popular nitrogen-sulfur solution used for direct application is 28-0-0-5S solution, which is produced by mixing expensive 12-0-0-26S ammonium thiosulfate (ATS) solution with expensive 32-0-0 urea-ammonium nitrate (UAN) solution. By practice of the teachings of the present invention, such use of expensive ATS solution can be avoided and use of expensive UAN solution can be substantially reduced by first producing an AS suspension intermediate for storage and then, when needed, blending the AS suspension intermediate with water and with substantially less UAN solution (than is required to produce 28-0-0-5S from ATS solution) to produce a 22-0-0-4S grade solution for direct application, which grade has the same nitrogen-to-sulfur ratio as the commonly used 28-0-0-5S solution derived from ATS solution. Although the logistics of fertilizer operations favor the more concentrated suspensions for storage and shipping, crystal-free solution fertilizer solutions, albeit, of slightly lower concentrations, are preferred for application. Such solutions can be applied through smaller nozzles at more uniform rates with little or no danger of plugging of the lines or nozzles. Thus, during field application, the lower concentrations of the crystal-free solutions of the present invention are more than offset by the ease and uniformity of application thereof.

EXAMPLE X

The tests and results reported in this example were made to demonstrate methods suitable for the elimination of expensive and complicated process steps and various other problems as well as ways and means to effect a decrease in the production costs and the degree of economic loss in the coke industry's by-product ammonium sulfate operations. These considerations are also pertinent to other by-product AS operations, such as results from the production of caprolactam. In the coke industry, coal is heated in ovens to produce coke. Heating of the coal in the coke ovens also generates coke gas which contains ammonia. The ammonia must be removed from the coke gas early in the process to reduce corrosion in downstream process equipment. This ammonia is usually removed by scrubbing the coke gas with sulfuric acid, the effluent from the scrubber being an ammonium sulfate slurry. This ammonium sulfate slurry is then concentrated with respect to the solids content and then sent to a centrifuge or other equipment to remove the ammonium sulfate mother liquor from the ammonium sulfate crystals. The resulting separated AS crystals then exit the centrifuge. The problems associated with small and wet ammonium sulfate crystals, supra, have already been explained in detail. Drying of these ammonium sulfate crystals improves storage of the small crystals somewhat, but the drying step is complicated and expensive, and even the dried fine-crystal AS is still quite unsatisfactory for use in the solid fertilizer industry, because the small AS crystals still tend to pack and cake during storage and because the small crystals are not well size matched with other commonly used fertilizer solids; particularly, in bulk-blending operations. However, by following the teachings of the present invention, the expensive and complicated steps of concentrating, centrifuging, and drying the fine AS crystals are eliminated by producing the instant AS suspension intermediate directly from the AS slurry effluent from the sulfuric acid scrubber. As an added advantage, the production rate of the coke oven can be increased or the size of the scrubber can be decreased, both of which decrease the retention time during AS crystallization, with the effect being that smaller crystals are produced, which in turn later results in the production of a higher quality AS suspension intermediate.

In an actual case study, a coke producer had recently purchased a centrifuge costing $350,000 which is at least 4 to 5 times as much as it would cost to purchase and install a common prefabricated, one-unit batch fluid fertilizer plant at their facilities. By the teachings of the present invention, such plant could easily be used to convert this producer's AS slurry from the sulfuric acid scrubber into AS suspension intermediates in a form eminently suitable for shipment to fertilizer dealers, thereby eliminating the need for the expensive centrifuge. This would represent substantial savings in capital and operating costs. At the same time, it would yield a final product more valuable and marketable than his present small, wet AS crystals, with which this coke producer is presently experiencing severe storage and handling problems.

Larger ammonium sulfate producers, such as in the caprolactam industry, who have elaborate, large, and expensive crystallizers with long retention times designed to produce large crystals, as well as expensive and complex liquid-solid separation and crystal washing and drying equipment, could also substantially simplify and decrease the cost of their operations by similarly altering their process operations, as explained above for the coke industry, to produce fine-crystal containing AS slurries and ultimately therefrom produce fine-crystal AS suspension intermediates of the instant invention.

INVENTION PARAMETERS

After sifting and winnowing through the data, supra, as well as other results and operations of my new, novel, and improved technique, including methods and means for the effecting thereof, the operating variables, including the acceptable and preferred conditions for carrying out my invention are summarized below:

| Variables | Operating Limits | Preferred Limits | Most Preferred Limits |
|---|---|---|---|
| Mixer Operating Conditions for Suspension Intermediates | | | |
| Temperature, °F. | 0–250 | 10–240 | 30–225 |
| Agitator tip speed, ft/s | 10–200 | 15–150 | 20–100 |
| Recirculation pump passes after addition of all feeds | 0–50 | 3–30 | 5–20 |
| Clay residence time, min | 3–30 | 4–25 | 5–20 |
| pH | 5–9 | 5.5–8.5 | 6–8 |
| Mixer Product Composition and Physical Properties | | | |
| Nitrogen, wt % | 10–18 | 11–17 | 12–16 |
| Sulfur, wt % | 11–20 | 12–19 | 13–18 |
| Clay, wt % | 0.5–4.0 | 0.75–3.5 | 1.0–3.0 |
| Ammonium sulfate saturation temperature, °F. | 180–Boiling | 200–Boiling | Boiling |

| Variables | Operating Limits | Preferred Limits | Most Preferred Limits |
|---|---|---|---|
| Mixer Operating Conditions for Solutions Produced from Suspension Intermediates | | | |
| Temperature, °F. | 0–280 | 10–270 | 30–260 |
| Agitator tip speed, ft/s | 10–150 | 15–125 | 20–100 |
| Recirculation pump passes after addition of all feeds | 0–10 | 2–8 | 3–5 |
| Mixer Product Composition and Physical Properties | | | |
| Nitrogen, wt % | 8–30 | 9–29 | 10–28 |
| Sulfur, wt % | 1–10 | 1.5–9 | 2–8 |
| Saturation temperature, °F. | −10–60 | −10–45 | −10–32 |

FEED/RAW MATERIAL CONSIDERATIONS

Solid, by-product AS crystals are essentially pure. The crystals, as delivered, usually have a moisture content ranging between about 0.2 percent to about 3% by weight. Likewise, by-product AS slurry is a fairly pure material, being contaminated perhaps only with small amounts of impurities in gas effluents from which the ammonia is scrubbed with sulfuric acid. Being slurries, the mother liquor thereof is saturated and is normally associated with between about 10% to about 90% by weight precipitated solids, albeit, above about 80% solids content, the slurry is more like a paste. The size of the crystals, whether they are separated from the mother liquor and marketed as solids or slurried therein, usually range from somewhere between about 100 up to about 2000 microns in size in their greatest dimension. If the crystals have been allowed reasonable time to develop and grow, they oftentimes appear to be an asymmetrical octagonal shape having a length to width ratio generally in the 2:1 to 1.5:1 range, although as noted above in the Reference Manual IFDC-R-1, supra, the crystal habit has been observed to vary depending on processing conditions. It will, of course, also be appreciated that in determining the above size range there will be a considerable number of crystals which, either through inadequate growth or handling fracture, will pass through a 100 micron sieve. Likewise, because of a propensity of many of these crystals to be of greater length than width, there exists a likelihood that crystals of substantially greater length than the 2000 micron processing limit, supra, may pass through a 2000 micron filter opening if they happen to enter same lengthwise. Accordingly, it is to be understood herein that the size range given above, to wit, from about 100 microns to about 2000 microns is a term used for convenience and refers to the great bulk of crystals normally found in ammonium sulfate slurries of the type herein described, utilized, and processed, and further represents perhaps upwards to about 95 or even perhaps 98% of the bulk weight of the solid phase.

Spent, waste, and by-product sulfuric acids usually contain from about 10% to about 80% by weight $H_2SO_4$ with the by-product materials usually containing the lesser amounts of $H_2SO_4$. It will be appreciated that in some industrial applications, sulfuric acids of relatively high concentrations, even perhaps approaching 90% to 95%, may in a particular processing operation be either intentionally combined with another material such as, for instance, nitric acid, or become contaminated with one or more materials, the net result of which renders such sulfuric acid unusable at a later time for many applications. Unfortunately, since other viable uses for these waste or spent materials are either unknown or because of shipping costs and other considerations impractical, they are oftentimes disposed of by practices now considered environmentally unsound, including so-called deep welling. Accordingly, it will be appreciated that practice of the instant invention by providing a viable use for such waste or spent materials is an important consideration not only from the economic aspects but also from environmental aspects.

Urea-ammonium nitrate solution, or UAN, as it is known in the trade, can vary in nitrogen content, expressed as N, from about 28 to about 37 weight percent, but usually is made commercially available with 32% N.

The gelling agent used in most of the tests, supra, was attapulgite type clay, although bentonite clay may, if the supply economics dictate, be substituted for all, or a portion thereof.

Usually from about 10% to about 40% by weight of the nitrogen content of the final NS solution product is supplied by the nitrogen in the suspension intermediate with the remainder thereof coming from other sources, preferably those introduced into the second mixing means. On the low end, i.e., about 10% of the nitrogen content, what is contemplated is a grade such as 28-0-0-2S or in the vernacular of the art a 14:1 nitrogen to sulfur ratio. More commonly the agronomic requirements of such materials tends to require a grade wherein the nitrogen to sulfur ratio is generally in the range from about 7:1 to about 5:1. More specifically and bridging said range of ratios of 7:1 to 5:1, the following grades would be included in this more preferred range with the actual nitrogen to sulfur ratio indicated in parenthesis:

25-0-0-3S (8.3)
22-0-0-4S (5.5)
20-0-0-5S (4)

On the higher end, i.e., about 30% of the nitrogen content such as a grade of 18-0-0-6S, of course, represents a nitrogen-to-sulfur ratio of 3:1 whereas about a 2:1 ratio would be represented by about a 15-0-0-8S material, which material might be required for higher sulfur deficient soil conditions. Referring to the above grades, it will be appreciated that at the 14:1 nitrogen to sulfur ratio, about 6% of the nitrogen is supplied in the final solution by applicant's suspension intermediate, whereas almost 30% is supplied when the ratio drops to about 3:1 and about 47% when the ratio drops to about 2:1. Accordingly, when from about 10% to about 40% of the nitrogen content of the final solution is supplied by the suspension intermediate, the ratio of the amount of nitrogen supplied as the nitrogen source introduced into the second mixing means to the amount of nitrogen supplied and introduced into the first mixing means ranges from about 1.5:1 to about 9:1. However, in the case of the 14:1 nitrogen to sulfur ratio, the above ratio of nitrogen supplied to the second mixing means compared to the amount supplied to the first mixing means is about 16:1, whereas on the other end of the range, i.e., the about 2:1 nitrogen to sulfur ratio, the ratio of the nitrogen supplied to the second mixing means compared to that supplied to the first mixing means drops to about 1:1.

Usually all of the sulfur in the final NS solution product is supplied by the low-cost by-product AS used as feedstock for production of the suspension intermediate. If desired, however, relatively small amounts of the total sulfur may be introduced from other sources in amounts ranging up to about 20% by weight thereof.

While I have shown and described particular embodiments of my invention, modifications and variations thereof will occur to those skilled in the art. I wish it to be understood, therefore, that the appended claims are intended to cover such modifications and variations which are within the true spirit and scope of my invention.

What I claim as new and desire to secure by Letters Patent of the United States is:

1. A process for producing solution-type fluid fertilizer product having a substantial portion of its sulfur values and at least a portion of its nitrogen values derived from an ammonium sulfate suspension intermediate material, said nitrogen values in said solution product ranging from about 8 percent to about 30 percent, and said sulfur values in said solution product ranging from about 1 percent to about 10 percent, and wherein said process comprises the following steps:
   (a) introducing into first mixing means for intimately mixing solid materials or fluid materials or both, amounts of water and amounts of a base material, said base material selected from the group consisting of ammonia, potassium hydroxide, sodium hydroxide, and mixtures thereof, said amounts of water predetermined for formulation with ammonium sulfate added in step (c), infra, of a later mentioned suspension intermediate containing from about 10 percent to about 18 percent nitrogen, expressed as N, and from about 11 percent to about 20 percent by weight sulfur, expressed as S, and said amount of base material predetermined to effect a pH ranging between about 5 and about 9 in said later mentioned suspension intermediate;

(b) introducing into said first mixing means amounts of a gelling agent sufficient to provide from about 0.5 percent to about 4 percent by weight of said gelling agent in said later mentioned suspension intermediate;

(c) introducing into said first mixing means an amount of ammonium sulfate solids, the amount of said ammonium sulfate solids predetermined, on a ratio basis, with the amount of water added in step (a), supra, to provide in said first mixing means a resulting suspension intermediate having a sulfur content ranging from between about 11 to about 20 weight percent and a nitrogen content ranging between about 10 to about 18 weight percent;

(d) subjecting the material resulting in said first mixing means to further intimate mixing for a period of time ranging from about 5 minutes to about 20 minutes;

(e) withdrawing from said first mixing means, as said resulting suspension intermediate, a X-O-O-Y type nitrogen-sulfur suspension, and introducing same into storage means for holding said suspension intermediate until at least a portion thereof is utilized as feedstock for production of said solution-type fluid fertilizer product in step (g), infra;

(f) introducing into second mixing means for mixing solids or fluids or both, an amount of a nitrogen source selected from the group consisting of solid urea, solid ammonium nitrate, an aqueous solution of urea, an aqueous solution of ammonium nitrate, and mixtures thereof together with any necessary water of formulation, and an amount of suspension intermediate removed from said storage means;

(g) providing in said second mixing means constant agitation for a time sufficient to effect substantially complete dissolution of the solid phase ammonium sulfate in said suspension intermediate together with any solid phase material contained in said introduced nitrogen source to produce a resulting solution fertilizer product; and (h) withdrawing from said second mixing means the resulting solution fertilizer product.

2. The process of claim 1, wherein said gelling agent is selected from the group consisting of attapulgite clay, bentonite clay, and mixtures thereof.

3. The process of claim 2, wherein the ratio of the amount of nitrogen supplied as the nitrogen source introduced into said second mixing means to the amount of nitrogen supplied and introduced into said first mixing means ranges from about 1.5:1 to about 9:1.

4. The process of claim 3, wherein from about 80 percent to about 100 percent by weight of the total sulfur content of the final NS solution product is supplied by means of said suspension intermediate.

5. The process of claim 2, wherein the amount of said base material is predetermined to effect a pH ranging between about 6 and about 8.

6. The process of claim 1, wherein step (c) is effected prior to the effecting of step (b) therein.

7. The process of claim 1, wherein step (c) is effected simultaneously with step (a) and prior to the effecting of step (b) therein.

8. A process for producing solution-type fluid fertilizer product having a substantial portion of its sulfur values and at least a portion of its nitrogen values derived from an ammonium sulfate suspension intermediate material, said nitrogen values in said solution product ranging from about 8 percent to about 30 percent, and said sulfur values in said solution product ranging from about 1 percent to about 10 percent, and wherein said process comprises the following steps:

(a) introducing into first mixing means for intimately mixing solid materials or fluid materials or both, amounts of ammonium sulfate slurry and amounts of a base material together with any necessary water of formulation, said base material selected from the group consisting of ammonia, potassium hydroxide, sodium hydroxide, and mixtures thereof, said ammonium sulfate slurry containing from about 10 percent to about 90 percent by weight liquid and from about 90 percent to about 10 percent by weight particulate solids, said particulate solids comprising crystals of ammonium sulfate ranging in length from between about 100 to about 2000 microns, and said amount of ammonium sulfate slurry predetermined on a ratio basis with said water of formulation to provide in said first mixing means a later mentioned suspension intermediate containing from about 10 percent to about 18 percent nitrogen, expressed as N, and from about 11 percent to about 20 percent by weight sulfur, expressed as S, and said amount of base material predetermined to effect a pH ranging between about 5 and about 9 in said later mentioned suspension intermediate;

(b) introducing into said first mixing means amounts of a gelling agent sufficient to provide from about 0.5 percent to about 4 percent by weight of said gelling agent in said later mentioned suspension intermediate;

(c) subjecting the material resulting in said first mixing means to further intimate mixing for a period of time ranging from about 5 minutes to about 20 minutes;

(d) withdrawing from said first mixing means, as a suspension intermediate, a X-O-O-Y type nitrogen-sulfur suspension, and introducing same into storage means for holding said suspension intermediate until at least a portion thereof is utilized as feedstock for production of said solution-type fluid fertilizer product in step (f), infra;

(e) introducing into second mixing means for mixing solids or fluids or both, an amount of a nitrogen source selected from the group consisting of solid urea, solid ammonium nitrate, an aqueous solution of urea, an aqueous solution of ammonium nitrate, and mixtures thereof together with any necessary water of formulation, and an amount of suspension intermediate removed from said storage means;

(f) providing in said second mixing means constant agitation for a time sufficient to effect substantially complete dissolution of the solid phase ammonium sulfate in said suspension intermediate together with any solid phase material contained in said introduced nitrogen source to produce a resulting solution fertilizer product; and (g) withdrawing from said second mixing means the resulting solution fertilizer product.

9. The process of claim 8, wherein said gelling agent is selected from the group consisting of attapulgite clay, bentonite clay, and mixtures thereof.

10. The process of claim 9, wherein the ratio of the amount of nitrogen supplied as the nitrogen source introduced into said second mixing means to the amount of nitrogen supplied and introduced into said first mixing means ranges from about 1.5:1 to about 9:1.

11. The process of claim 10, wherein from about 80 percent to about 100 percent by weight of the total sulfur content of the final NS solution product is supplied by means of said suspension intermediate.

12. A process for producing solution-type fluid fertilizer product having a substantial portion of its sulfur values and at least a portion of its nitrogen values derived from an ammonium sulfate suspension intermediate material, said nitrogen values in said solution product ranging from about 8 percent to about 30 percent, and said sulfur values in said solution product ranging from about 1 percent to about 10 percent, and wherein said process comprises the following steps:

(a) introducing into first mixing means for mixing solid materials or fluid materials or both, amounts of water and amounts of a base material, said base material selected from the group consisting of ammonia, potassium hydroxide, sodium hydroxide, and mixtures thereof, said amounts of water predetermined for formulation with ammonium sulfate slurry added in step (c), infra, of a later mentioned suspension intermediate containing from about 10 percent to about 18 percent nitrogen, expressed as N, and from about 11 percent to about 20 percent, by weight, sulfur, expressed as S, and said amount of base material predetermined to effect a pH ranging between about 5 and about 9 in said later mentioned suspension intermediate;

(b) introducing into said first mixing means amounts of a gelling agent sufficient to provide from about 0.5 percent to about 4 percent by weight of said gelling agent in said later mentioned suspension intermediate;

(c) introducing into said first mixing means an amount of ammonium sulfate slurry, said ammonium sulfate slurry containing from about 10 percent to about 90 percent by weight liquid and from about 90 percent to about 10 percent by weight particulate solids, said particulate solids comprising crystals of ammonium sulfate ranging in length from between about 100 to about 2000 microns, and said amount of ammonium sulfate slurry predetermined on a ratio basis with the amount of water added in step (a), supra, to provide in said first mixing means a resulting suspension intermediate having a sulfur content ranging from between about 11 to about 20 weight percent and a nitrogen content ranging between about 10 to about 18 weight percent;

(d) subjecting the material resulting in said first mixing means to further intimate mixing for a period of time ranging from about 5 minutes to about 20 minutes;

(e) withdrawing from said first mixing means, as said resulting suspension intermediate, a X-O-O-Y type nitrogen-sulfur suspension, and introducing same into storage means for holding said suspension intermediate until at least a portion thereof is utilized as feedstock for production of said solution-type fluid fertilizer product in step (g), infra;

(f) introducing into second mixing means for mixing solids or fluids or both, an amount of a nitrogen source selected from the group consisting of solid urea, solid ammonium nitrate, an aqueous solution of urea, an aqueous solution of ammonium nitrate, and mixtures thereof together with any necessary water of formulation, and an amount of suspension intermediate removed from said storage means;

(g) providing in said second mixing means constant agitation for a time sufficient to effect substantially complete dissolution of the solid phase ammonium sulfate in said suspension intermediate together with any solid phase material contained in said introduced nitrogen source to produce a resulting solution fertilizer product; and (h) withdrawing from said second mixing means the resulting solution fertilizer product.

13. The process of claim 12, wherein said gelling agent is selected from the group consisting of attapulgite clay, bentonite clay, and mixtures thereof.

14. The process of claim 13, wherein the ratio of the amount of nitrogen supplied as the nitrogen source introduced into said second mixing means to the amount of nitrogen supplied and introduced into said first mixing means ranges from about 1.5:1 to about 9:1.

15. The process of claim 14, wherein from about 80 percent to about 100 percent by weight of the total sulfur content of the final NS solution product is supplied by means of said suspension intermediate.

16. The process of claim 13, wherein the amount of said base material is predetermined to effect a pH ranging between about 6 and about 8.

17. A process for producing solution-type fluid fertilizer product having a substantial portion of its sulfur values and at least a portion of its nitrogen values derived from an ammonium sulfate suspension intermediate material, said nitrogen values in said solution product ranging from about 8 percent to about 30 percent, and said sulfur values in said solution product ranging from about 1 percent to about 10 percent, and wherein said process comprises the following steps:

(a) introducing into first mixing means for mixing solid materials or fluid materials or both, amounts of by-product or waste sulfuric acid, amounts of any necessary water of formulation, and amounts of ammonia, said amounts of ammonia predetermined to effect a pH ranging between about 5 and about 9 in a later mentioned suspension intermediate, said sulfuric acid comprising materials containing from about 10 percent to about 80 percent $H_2SO_4$ by weight, and said amounts of sulfuric acid predetermined for effecting formation with said ammonia and water of formulation of a slurry of ammonium sulfate comprising a later mentioned suspension intermediate containing from about 10 percent to about 18 percent nitrogen, expressed as N, and from about 11 percent to about 20 percent by weight sulfur, expressed as S;

(b) cooling the material resulting in said first mixing means to a temperature in the range of from about 80° F. to about 120° F.;

(c) providing in said first mixing means constant agitation and introducing thereinto amounts of a gelling agent sufficient to provide from about 0.5 percent to about 4 percent by weight of said gelling agent in said later mentioned suspension intermediate;

(d) providing in said first mixing means constant agitation sufficient to subject the material resulting therein to agitation for a period of time ranging from about 5 to about 20 minutes;

(e) withdrawing from said first mixing means as said resulting suspension intermediate, a X-O-O-Y type nitrogen-sulfur suspension, and introducing same into storage means for holding said suspension intermediate until at least a portion thereof is utilized as feedstock for production of said solution-type fluid fertilizer product in step (g), infra;

(f) introducing into second mixing means for mixing solids or fluids or both, an amount of a nitrogen source selected from the group consisting of solid urea, solid ammonium nitrate, an aqueous solution of urea, an aqueous solution of ammonium nitrate, and mixtures thereof together with any necessary water of formulation, and an amount of said suspension intermediate removed from said storage means;

(g) providing in said second mixing means constant agitation for a time sufficient to effect substantially complete dissolution of the solid phase ammonium sulfate in said suspension intermediate together with any solid phase material contained in said introduced nitrogen source to produce a resulting solution fertilizer product; and (h) withdrawing from said second mixing means the resulting solution fertilizer product.

18. The process of claim 17, wherein said gelling agent is selected from the group consisting of attapulgite clay, bentonite clay, and mixtures thereof.

19. The process of claim 18, wherein the ratio of the amount of nitrogen supplied as the nitrogen source introduced into said second mixing means to the amount of nitrogen supplied and introduced into said first mixing means ranges from about 1.5:1 to about 9:1.

20. The process of claim 19, wherein from about 80 percent to about 100 percent by weight of the total sulfur content of the final NS solution product is supplied by means of said suspension intermediate.

21. The process of claim 18, wherein the amount of said ammonia is predetermined to effect a pH ranging between about 6 and about 8.

22. A process for producing solution-type fluid fertilizer product having a substantial portion of its sulfur values and at least a portion of its nitrogen values derived from an ammonium sulfate suspension intermediate material, said nitrogen values in said solution product ranging from about 8 percent to about 30 percent, and said sulfur values in said solution product ranging from about 1 percent to about 10 percent, and wherein said process comprises the steps of:

(a) simultaneously introducing into a first mixer means for intimately mixing solid materials or fluid materials or both a stream of water, a stream of base material, a stream of ammonium sulfate material, and a stream of gelling agent, said base material selected from the group consisting of ammonia, potassium hydroxide, sodium hydroxide, and mixtures thereof, said ammonium sulfate material selected from the group consisting of ammonium sulfate solids, ammonium sulfate slurry, and mixtures thereof, said ammonium sulfate solids having a moisture content ranging between about 0.2 percent to about 3 percent by weight, said ammonium sulfate slurry containing from about 10 to about 90 percent liquid and from about 90 percent to about 10 percent by weight particulate solids, said particulate solids comprising crystals of ammonium sulfate ranging in length from between about 100 to about 2000 microns, said gelling agent predetermined to provide from about 0.5 percent to about 4 percent by weight thereof, in a later mentioned suspension intermediate the relative portion of said stream of ammonium sulfate material and the relative portion of said stream of water predetermined to effect formulation of a later mentioned suspension intermediate containing from about 10 percent to about 18 percent nitrogen, expressed as N, and from about 11 percent to about 20 percent by weight sulfur, expressed as S, and the relative portion of said stream of base material and the relative portion of said stream of ammonium sulfate material predetermined to effect a pH ranging between about 5 and about 9 in said later mentioned suspension intermediate;

(b) simultaneously with the introduction of said streams of material into said first mixer means in step (a), supra, providing therein intimate mixing of the materials thereinto introduced;

(c) subsequently withdrawing from said first mixing means, as said resulting suspension intermediate, a X-O-O-Y type nitrogen-sulfur suspension, and introducing same into storage means for holding said suspension intermediate until at least a portion thereof is utilized as feedstock for production of said solution-type fluid fertilizer product in step (e), infra;

(d) subsequently introducing into second mixing means for intimately mixing solids or fluids or both, an amount of a nitrogen source selected from the group consisting of solid urea, solid ammonium nitrate, an aqueous solution of urea, an aqueous solution of ammonium nitrate, and mixtures thereof together with any necessary water of formulation, and an amount of suspension intermediate removed from said storage means, supra;

(e) providing in said second mixing means continued intimate mixing for a time sufficient to effect substantially complete dissolution of the solid phase ammonium sulfate in said suspension intermediate together with any solid phase material contained in said introduced nitrogen source to produce a resulting solution fertilizer product; and (f) withdrawing from said second mixing means the resulting solution fertilizer product.

23. The process of claim 22, wherein the amount of said base material is predetermined to effect a pH ranging between about 6 and about 8.

* * * * *